(12) United States Patent
Armesto-Beyer

(10) Patent No.: US 12,147,250 B2
(45) Date of Patent: Nov. 19, 2024

(54) GAS-PRESSURE REGULATOR

(71) Applicant: TRUMA GERAETETECHNIK GMBH & CO. KG, Putzbrunn (DE)

(72) Inventor: Kai Armesto-Beyer, Putzbrunn (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 9 days.

(21) Appl. No.: 18/267,656

(22) PCT Filed: Oct. 13, 2021

(86) PCT No.: PCT/EP2021/000124
§ 371 (c)(1),
(2) Date: Jun. 15, 2023

(87) PCT Pub. No.: WO2022/148522
PCT Pub. Date: Jul. 14, 2022

(65) Prior Publication Data
US 2024/0053778 A1    Feb. 15, 2024

(30) Foreign Application Priority Data
Jan. 11, 2021 (DE) .......................... 102021000068.4

(51) Int. Cl.
*G05D 16/06* (2006.01)
(52) U.S. Cl.
CPC .............................. *G05D 16/0683* (2013.01)

(58) Field of Classification Search
CPC .......... Y10T 137/261; Y10T 137/7793; Y10T 137/783; G05D 16/0683; G05D 16/0675; G05D 16/063; G05D 16/0691; G05D 16/0636
See application file for complete search history.

(56) References Cited

U.S. PATENT DOCUMENTS

| | | | | |
|---|---|---|---|---|
| 2,898,930 A | * | 8/1959 | St Clair | G05D 16/0694 137/505.46 |
| 3,488,685 A | * | 1/1970 | Hughes | G05D 16/0683 137/505.46 |
| 3,599,658 A | * | 8/1971 | Kruzan | G05D 16/0683 137/505.46 |
| 4,069,839 A | * | 1/1978 | Hughes | G05D 16/0686 137/505.46 |
| 4,503,883 A | * | 3/1985 | Meacham, Jr. | G05D 16/0686 137/461 |

(Continued)

FOREIGN PATENT DOCUMENTS

| | | |
|---|---|---|
| DE | 551843 A | 6/1932 |
| DE | 102019103201 A1 | 8/2020 |

(Continued)

*Primary Examiner* — Jessica Cahill
(74) *Attorney, Agent, or Firm* — McNees Wallace & Nurick LLC

(57) ABSTRACT

Example embodiments relate to a gas-pressure regulator having an inlet, an outlet, a housing, a diaphragm, a control chamber and a discharge chamber. The inlet and the outlet each open onto the control chamber, wherein the diaphragm partially delimits the control chamber. A passage between the control chamber and the discharge chamber is open in one position of the diaphragm. A movable limiting element limits a movement of the diaphragm in one direction.

5 Claims, 5 Drawing Sheets

(56) References Cited

U.S. PATENT DOCUMENTS

| | | | | |
|---|---|---|---|---|
| 5,735,306 A | * | 4/1998 | Olds | ................ G05D 16/0686 |
| | | | | 137/505.46 |
| 2012/0111425 A1 | * | 5/2012 | Hawkins | ............ G05D 16/0683 |
| | | | | 137/489 |
| 2019/0155316 A1 | * | 5/2019 | Silvius | ................ F16K 17/048 |

FOREIGN PATENT DOCUMENTS

| | | | |
|---|---|---|---|
| FR | 1550319 A | * | 12/1968 |
| GB | 582051 A | | 11/1946 |
| GB | 1273358 A | | 5/1972 |
| GB | 2518599 A | | 4/2015 |
| WO | 1997017641 A1 | | 5/1997 |
| WO | 2020030398 A1 | | 2/2020 |
| WO | 2020160948 A1 | | 8/2020 |

* cited by examiner

GAS-PRESSURE REGULATOR

TECHNICAL FIELD

The present disclosure relates to a gas-pressure regulator.

BACKGROUND

Gas-pressure regulators are described in documents DE 10 2019 103 201 A1 or WO 2020/030398 A1, for example. The regulators reduce the gas pressure from a gas source to a gas pressure for downstream consumers. Some regulators have a pressure relief valve which discharges gas to the surroundings in case of an excessive pressure. Regulators having pressure relief valves are described in documents DE 551 843 A or GB 582,051 A, for example. This overpressure is above the normally usual pressure applied. For specific cases of application, for example for camping, it is provided to perform leakage tests on the gas-pressure regulators and the downstream low-pressure system. However, the applied pressure here is in most cases above the pressure at which the pressure relief valve reacts.

Therefore, in view of the problems associated with conventional gas-pressure regulators, there remains a need to propose a gas-pressure regulator which has a kind of pressure relief valve and simultaneously permits an overpressure test.

SUMMARY

The present disclosure achieves the object by a gas-pressure regulator having an inlet, an outlet, a housing, a diaphragm, a control chamber and a discharge chamber, wherein the inlet and the outlet each open onto the control chamber, wherein the diaphragm partially delimits the control chamber, wherein a passage between the control chamber and the discharge chamber is open in one position of the diaphragm, and wherein a movable limiting element is provided which limits a movement of the diaphragm in one direction.

The gas-pressure regulator according to example embodiments has an inlet and an outlet each opening onto a control chamber. In this control chamber, the reduction of the applied gas pressure to the desired gas pressure is carried out. The diaphragm is provided for pressure regulation which partially delimits the control chamber, i.e., forms part of the peripheral wall of the control chamber. The diaphragm is movably arranged within the housing of the gas-pressure regulator. During normal operation, this movability serves to regulate the pressure by changing the volume of the control chamber. A passage between the control chamber and a discharge chamber is open in one position of the diaphragm. If in the normal state, gas flows only within the control chamber, a passage to a discharge chamber can be produced by the positioning of the diaphragm. The discharge chamber is thus preferably connected to the outside world around the gas-pressure regulator. This allows the gas to escape out of the control chamber to the surroundings via the discharge chamber. Thus, a relative simple reduction of the overpressure is provided. Therefore, the function of a pressure relief valve is provided by the passage and the discharge chamber. A limiting element is additionally provided. The limiting element itself is movable. This is intended to allow the movement thereof from one position into another position. Insofar as the purpose of the limiting element is to block the pressure relief valve only for a leakage test, it is necessary that the limiting element is active only temporarily and in particular only during the test. The movability is therefore provided so that the limiting element can be moved away again. The limiting element serves to limit a movement of the diaphragm in one direction. If the movement of the diaphragm is limited, it is thus preferably ensured that the passage between the control chamber and the discharge chamber is not opened. The pressure relief valve is thus blocked, and the pressure test can be carried out.

One configuration provides that the gas-pressure regulator further has a control element, that the diaphragm and the control element are configured and arranged within the housing such that the diaphragm and the control element are movable relative to each other, and that in a relative discharge arrangement of the diaphragm and the control element, the passage between the control chamber and the discharge chamber is open. In this configuration, the position of the diaphragm for opening the passage is provided by the relative discharge arrangement between the diaphragm and the control element. In this configuration, the control element which is designed as a kind of plunger in one configuration additionally serves to regulate the pressure.

One configuration provides that the limiting element limits the movement of the diaphragm away from the control chamber. Usually, this direction of motion is given when the diaphragm reacts to an increased pressure in the control chamber. Therefore, this is also the direction in which the diaphragm moves until the pressure relief valve is activated. Due to the limitation of the movement of the diaphragm in this direction, it is thus possible to prevent an opening of the passage between the control chamber and the discharge chamber. Therefore, the dimensions and geometries each have to be selected and adapted to each other such that the opening of the passage just cannot occur.

One configuration includes that the control element projects through the diaphragm and that the passage between the control element and the diaphragm opens. In this configuration, the control element is located in the diaphragm and is thus—preferably radially—surrounded by the diaphragm. An opening is provided between the diaphragm and the control element, which usually is closed by the relative position of the diaphragm and the control element relative to each other. The passage opens only when the diaphragm moves due to a pressure increase in the control chamber, for example, to a certain position relative to the control element to the center thereof.

In one configuration, the diaphragm and the control element have structures which overlap or complement each other in a relative arrangement such that the passage is closed. However, if the distance between the diaphragm and the control element sufficiently increases, the structures do no longer engage or complement each other, and the passage between the two components is opened. The gas can thus flow into the discharge chamber.

One configuration provides that the limiting element is movable between an active and an inactive position and in that the limiting element limits the movement of the diaphragm only in the active position. In this configuration, the limiting element can be moved between two positions. The limiting element limits the movement of the diaphragm only in an active position and not otherwise. In one configuration, it is provided that the active position is clearly indicated by an indication for the user.

One configuration consists in that the limiting element is configured and arranged to as to be rotatable about the control element between the active and the inactive position. Alternatively or additionally, a configuration provides that the limiting element is configured and arranged so as to be radially displaceable with respect to the control element between the active and the inactive position. Alternatively or additionally, one configuration consists in that the limiting element is configured and arranged so as to be axially rotatable and/or displaceable along the control element between the active and the inactive position. The aforementioned configurations have in common that the limiting element is respectively subjected to a mechanical movement as a result of which it can be activated or deactivated.

One configuration includes that a lever and a sealing element are movably arranged within the housing, that the sealing element is located between the inlet and the control chamber, and that the lever is in mechanical contact with the control element. This type of gas-pressure regulator is disclosed, for example, in document DE 10 2019 103 201 A1 or WO 2020/030398 A1 cited in the introductory part.

BRIEF DESCRIPTION OF DRAWINGS

More specifically, there are several possibilities of configuring and further developing the gas-pressure regulator. To this end, reference is made on the one hand to the claim subordinate to the independent claims, and on the other hand to the description below of example embodiments in conjunction with the drawing, in which:

DETAILED DESCRIPTION OF EXAMPLE EMBODIMENTS

Figure 1:
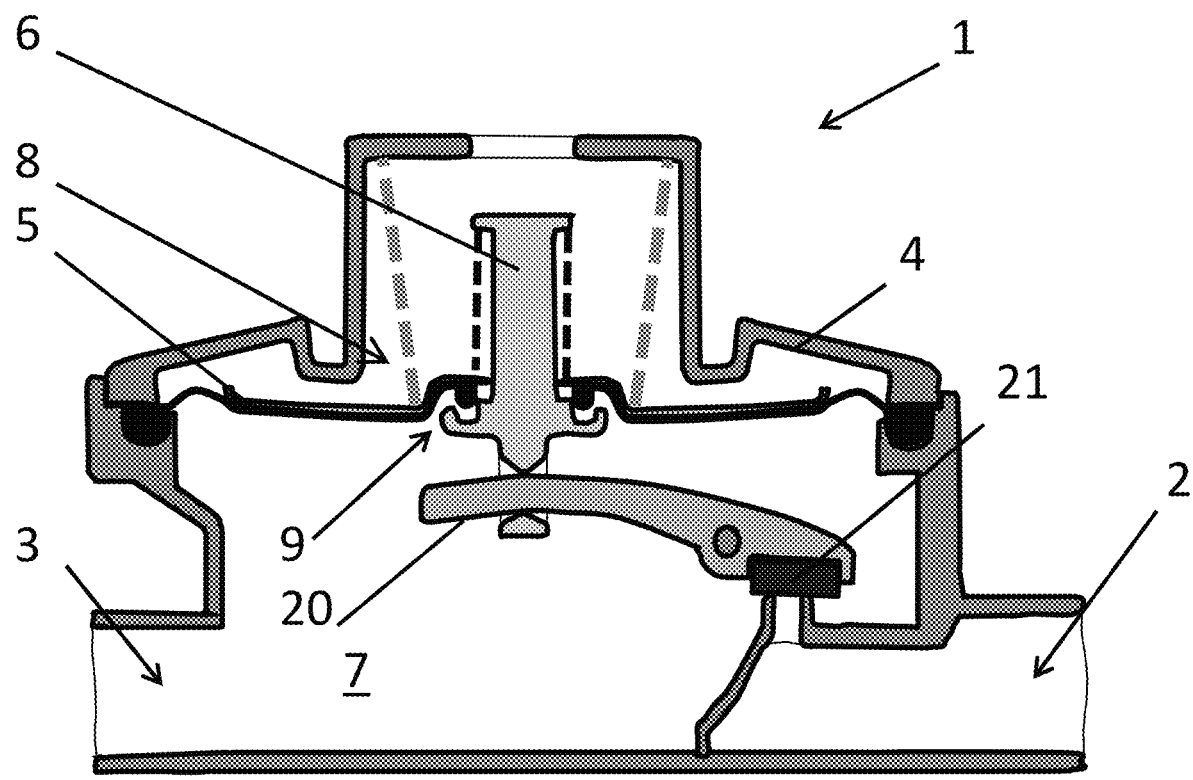
FIG. 1 shows a section through a configuration of a gas-pressure regulator according to the prior art.

FIG. 1 shows a section through a gas-pressure regulator 1 according to the prior art. A control chamber 7 which is delimited on the upper side by a movable diaphragm 5 is located within the housing 4 of the regulator 1 between an inlet 2 and an outlet 3 for the gas. The diaphragm 5 surrounds a plunger-shaped control element 6 which projects centrally through the diaphragm 5. The diaphragm 5 and the possibility to change the volume of the control chamber 7 through it, and the control element 6 which is connected to a lever 20 serve to regulate the pressure. On the side of the discharge chamber 8, the diaphragm 5 is loaded with a spring which pushes the diaphragm 5 in the direction of the control chamber 7. The lever 20 is rotatably mounted within the housing 4 and closes the inlet 2 into the control chamber by means of a sealing element 21.

For the case (represented here) that the applied gas pressure increases too much, a kind of pressure relief valve is provided. When the pressure increases, the diaphragm 5 moves away from the control chamber 7. A passage 9 is thus however formed between the diaphragm 5 and the control element 6 in the center thereof. Due to his passage 9 or generally the opening between the center recess of the diaphragm 5 and the control element 6, the gas can flow out of the control chamber 7 and into the discharge chamber 8. The discharge chamber 8 is connected to the surroundings around the gas-pressure regulator 1 via an opening arranged at the upper end here. The fact that the passage 9 opens when a certain pressure in the control chamber 7 is reached however results in that a pressure test with a pressure above the value at which the pressure relief valve reacts is not possible.

Figure 2:
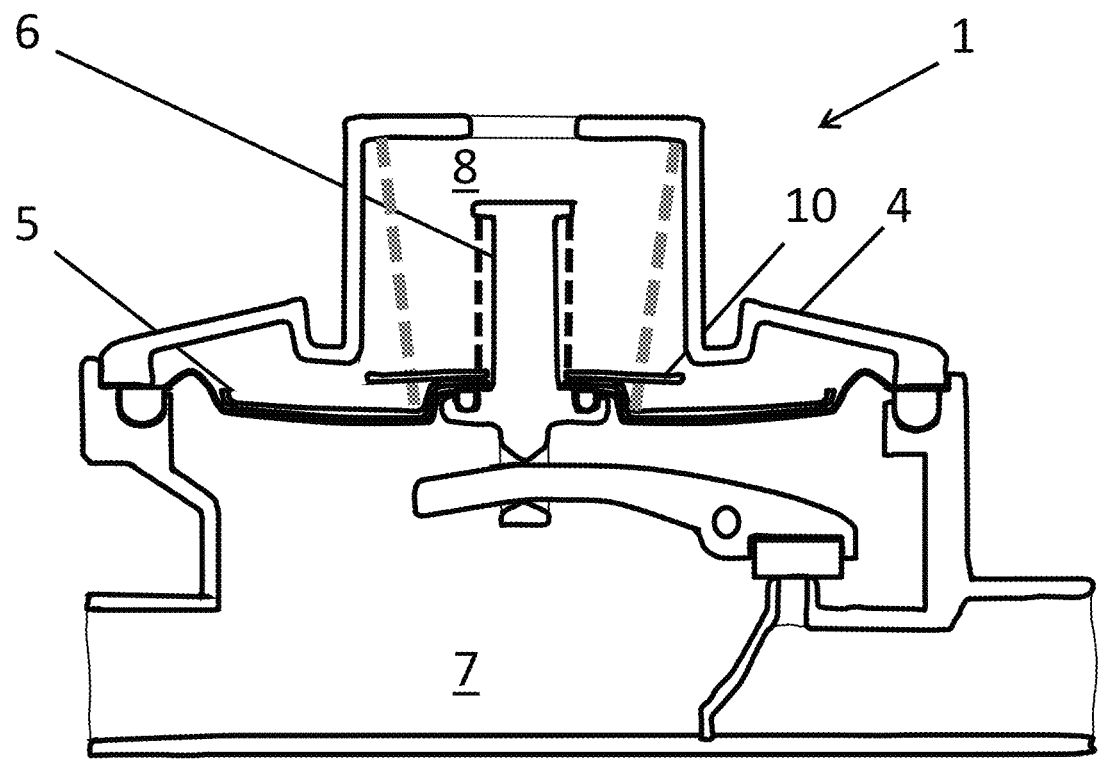
FIG. 2 shows a section through a first configuration of a gas-pressure regulator according to an example embodiment with an inactive limiting element in a first phase.

FIG. 2 shows a first configuration of the gas-pressure regulator 1 according to an example embodiment, identical components being denoted by the same reference numerals as in FIG. 1. Therefore, to avoid repetitions, only the differences will be described here.

The essential difference is the variably insertable limiting element 10 which is here located in the discharge chamber 8 above the diaphragm 5. In its activated phase, the limiting element 10 limits the movement of the diaphragm 5 in the direction perpendicular to the diaphragm 5 or along the control element 6 or away from the control chamber 7. It is thus prevented that due to a pressure increase in the control chamber 7, the diaphragm 5 can move away to such an extent that the passage can open (cf. FIG. 1). This also permits to apply a pressure in the control chamber 7 as is necessary for a pressure test. In this configuration, the limiting element 10 is a component rotatable about the control element 6 which can be rotated into the active position—represented here—only for the pressure test. To this end, a geometry having recesses or bosses is for example provided, which is active for travel limitation only in a certain arrangement relative to the other components or for example relative to the housing.

In FIG. 2, in a first phase, the limiting element 10 is located in the discharge chamber 8 above the diaphragm 5 and below a neck area of the housing 4. When the diaphragm 5 moves upwards, it entrains the limiting element 10 in this direction upwards. It can be seen that the limiting element 10 is rotated about the control element 6 so as to fit into the neck of the housing 4 when it is moved upwards and therefore does not limit the movement of the diaphragm 5.

Figure 3:
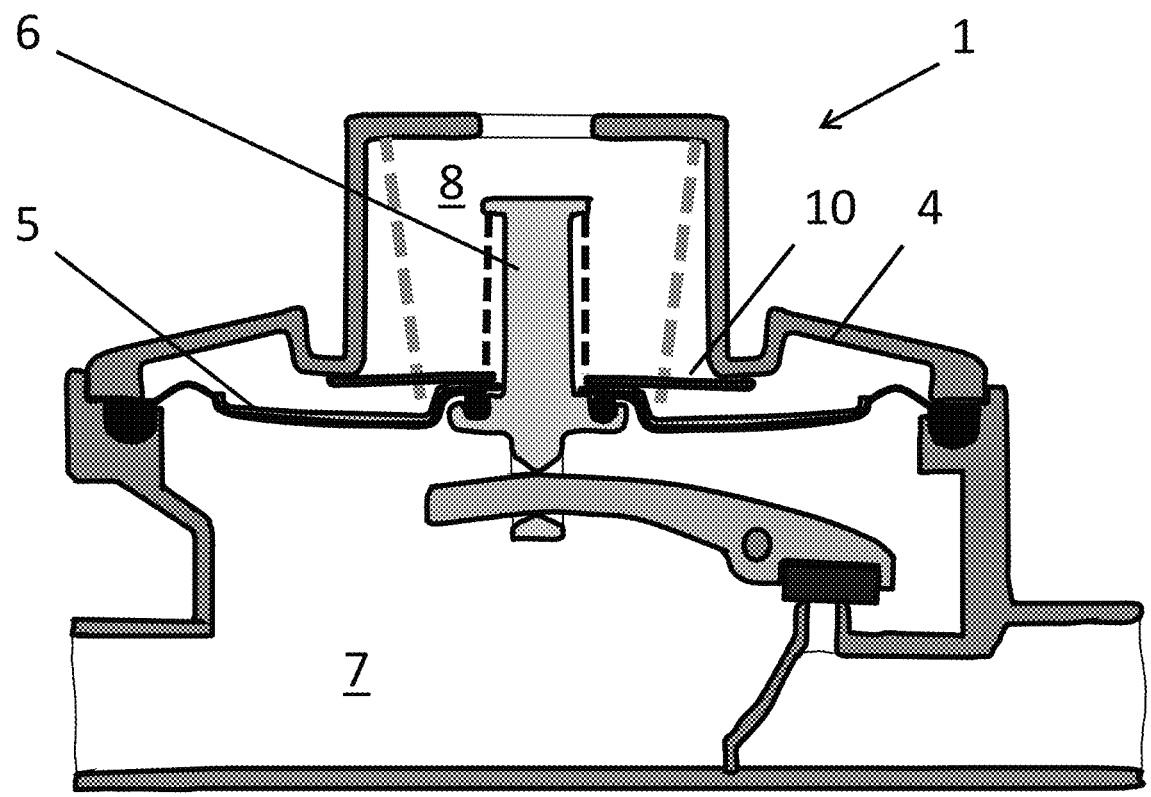
FIG. 3 shows the gas-pressure regulator of FIG. 2 with an active limiting element in a second phase.

FIG. 3 shows a second phase in which a pressure prevails in the control chamber 7 which is higher than in the first phase of FIG. 2 and deflects the diaphragm 5 further upwards. The moment is represented at which the limiting element 10 now activated by the rotation thereof abuts against the housing 4 and thus prevents a further movement of the diaphragm 5. This prevents the passage between the diaphragm 5 and the control element 6 from opening as a pathway between the control chamber 7 and the discharge chamber 8. This in turn allows the pressure in the control chamber 7 to be further increased for the pressure test.

The limiting element 10 of the first configuration of FIG. 2 and FIG. 3 has a non-rotationally symmetrical shape, so that a rotation activates the limiting element 10 or sets the latter in the inactive state.

Figure 4:
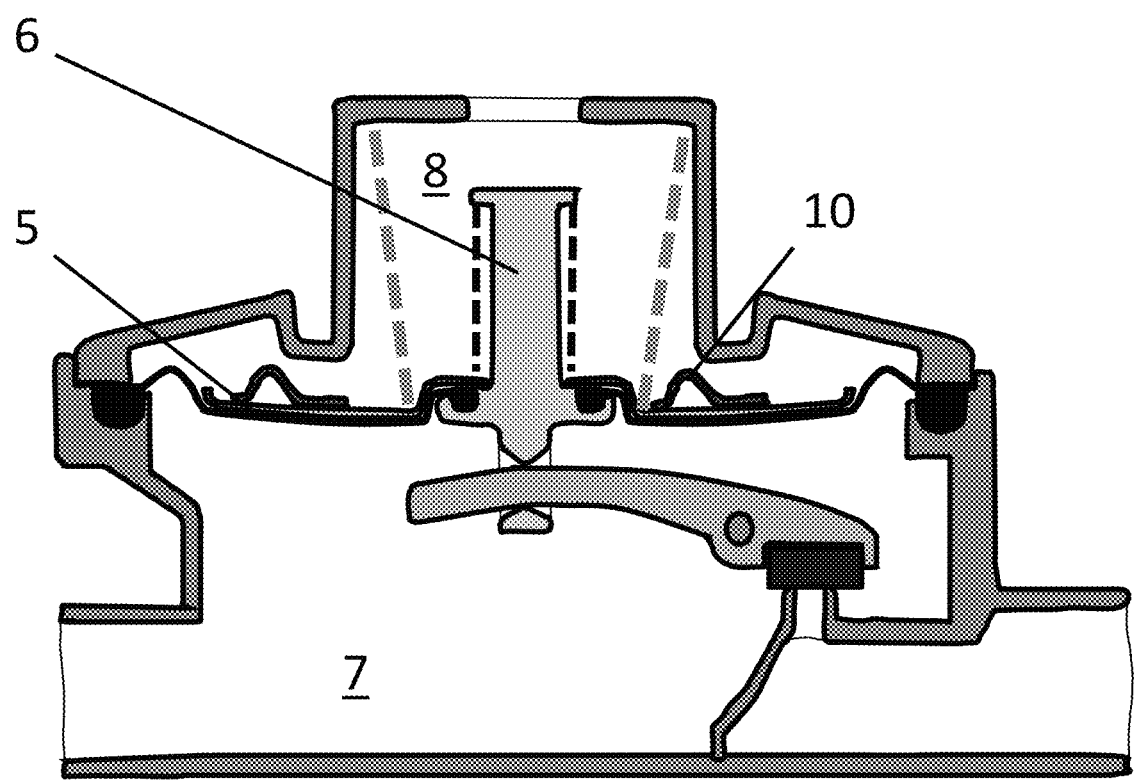
FIG. 4 shows a section through a second embodiment of a gas-pressure regulator according to an example embodiment with an inactive limiting element in a first phase.
Figure 5:
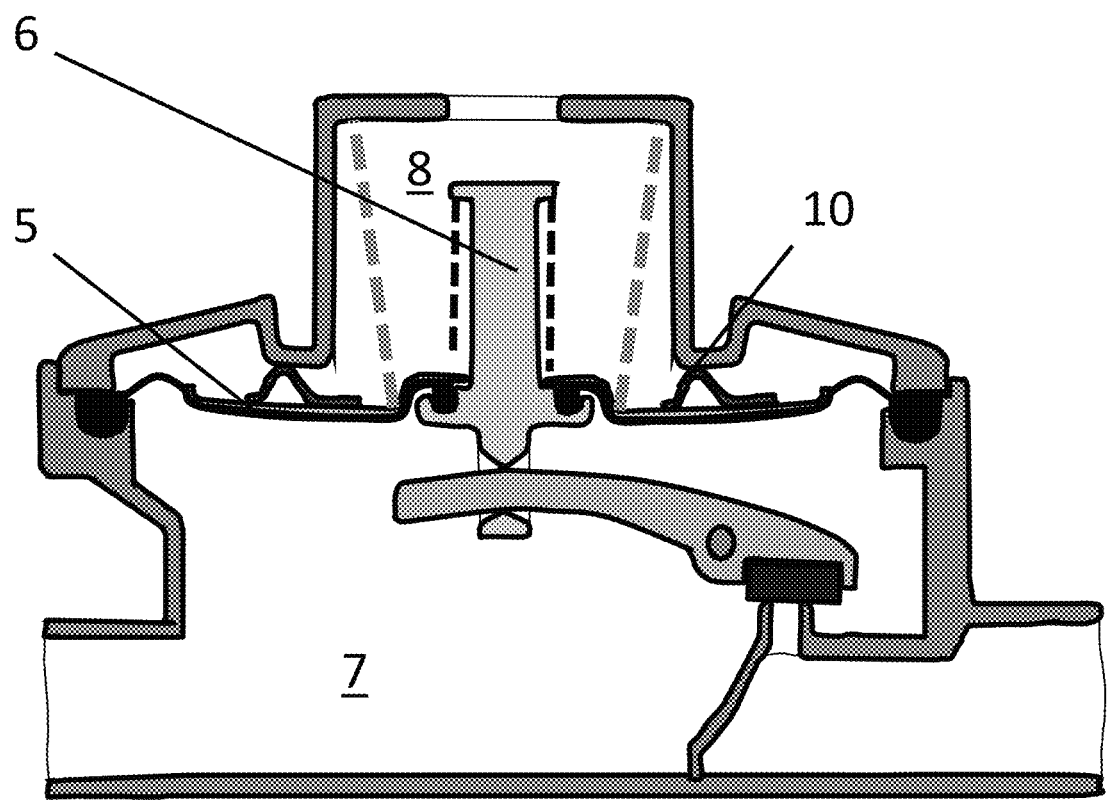
FIG. 5 shows the gas-pressure regulator of FIG. 4 with an active limiting element in a second phase.

The limiting element 10 of the second configuration of FIG. 4 and FIG. 5 is radially displaceable.

In FIG. 4, the limiting element 10 is arranged such that in case of a pressure increase, it does not abut against the neck of the housing and therefore does not block a further movement of the diaphragm in the direction of the discharge chamber 8. Therefore, this is the inactive position of the limiting element 10 and also the normal operating state of the pressure-gas regulator.

FIG. 5 shows the activated state of the limiting element 10, a section being arranged radially further inwards and another section being arranged radially further outwards than in the inactivated state of FIG. 4. The wave-like sections of the limiting element 10 thus come into contact with the housing in case of a pressure increase and therefore limit the axial movement of the diaphragm 5 along the control element 6.

In a further configuration (not shown here), the limiting element itself is configured and arranged so as to be movable axially along the axis of motion of the diaphragm or along the control element.

LIST OF REFERENCE NUMERALS

1 gas-pressure regulator
2 inlet
3 outlet
4 housing
5 diaphragm
6 control element
7 control chamber
8 discharge chamber
9 passage
10 limiting element
20 lever
21 sealing element

The invention claimed is:

1. A gas-pressure regulator, comprising:
an inlet, an outlet, a housing, a diaphragm, a control chamber and a discharge chamber,
wherein the inlet and the outlet each open onto the control chamber,
wherein the diaphragm partially delimits the control chamber,
wherein a passage between the control chamber and the discharge chamber is open in one position of the diaphragm,
wherein a movable limiting element is provided,
wherein the limiting element limits a movement of the diaphragm away from the control chamber so that the passage does not open,
wherein the limiting element is movable between an active and an inactive position, and
wherein the limiting element limits the movement of the diaphragm only in the active position.

2. The gas-pressure regulator according to claim 1,
wherein the gas-pressure regulator further has a control element,
wherein the diaphragm and the control element are configured and arranged within the housing such that the diaphragm and the control element are movable relative to each other,
wherein the passage between the control chamber and the discharge chamber is open in a relative discharge arrangement of the diaphragm and the control element.

3. The gas-pressure regulator according to claim 2,
wherein the limiting element is configured and arranged so as to be rotatable about the control element between the active and the inactive position,
wherein in the inactive position, the limiting element fits into a neck area of the housing when the diaphragm moves away from the control chamber, and
wherein in an active position, the limiting element abuts against the housing when the diaphragm moves away from the control chamber.

4. The gas-pressure regulator according to claim 2,
wherein the limiting element is configured and arranged so as to be radially displaceable with respect to the control element between the active and the inactive position,
wherein in the active position, the limiting element is located radially further inwards or outwards than in the inactive position,
wherein in the inactive position, the limiting element does not abut against a neck of the housing when the diaphragm moves away from the control chamber, and
wherein in an active position, the limiting element comes into contact with the housing when the diaphragm moves away from the control chamber.

5. The gas-pressure regulator according to claim 2,
wherein a lever and a sealing element are movably arranged within the housing,
wherein the sealing element is located between the inlet and the control chamber, and
wherein the lever is in mechanical contact with the control element.

* * * * *